(12) United States Patent
Gao

(10) Patent No.: US 11,409,108 B2
(45) Date of Patent: Aug. 9, 2022

(54) NEAR-EYE DISPLAY PANEL AND NEAR-EYE DISPLAY DEVICE

(71) Applicant: BOE TECHNOLOGY GROUP CO., LTD., Beijing (CN)

(72) Inventor: Jian Gao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 273 days.

(21) Appl. No.: 16/756,000

(22) PCT Filed: May 30, 2019

(86) PCT No.: PCT/CN2019/089240
§ 371 (c)(1),
(2) Date: Apr. 14, 2020

(87) PCT Pub. No.: WO2020/237562
PCT Pub. Date: Dec. 3, 2020

(65) Prior Publication Data
US 2021/0405368 A1 Dec. 30, 2021

(51) Int. Cl.
*G02B 27/01* (2006.01)
*G02B 3/00* (2006.01)

(52) U.S. Cl.
CPC ....... *G02B 27/0172* (2013.01); *G02B 3/0037* (2013.01)

(58) Field of Classification Search
CPC .......................... G02B 27/0172; G02B 3/0037
USPC ........................................................ 359/630
See application file for complete search history.

(56) References Cited

U.S. PATENT DOCUMENTS

2019/0033597 A1 1/2019 McDowall et al.

FOREIGN PATENT DOCUMENTS

| CN | 103823305 | A | * | 5/2014 | |
|---|---|---|---|---|---|
| CN | 103823305 | A | | 5/2014 | |
| CN | 205539717 | U | | 8/2016 | |
| CN | 106019605 | A | | 10/2016 | |
| CN | 106409156 | A | | 2/2017 | |
| CN | 109459860 | A | * | 3/2019 | ......... G02B 27/0172 |
| CN | 109459860 | A | | 3/2019 | |
| EP | 3489737 | A2 | | 5/2019 | |

(Continued)

OTHER PUBLICATIONS

PCT International Search Report, Application No. PCT/CN2019/089240, dated Dec. 27, 2019, 8 pages: with English translation.

(Continued)

*Primary Examiner* — Jerry L Brooks
(74) *Attorney, Agent, or Firm* — Armstrong Teasdale LLP

(57) ABSTRACT

Embodiments of the present disclosure relate to a near-eye display panel and a near-eye display device. The near-eye display panel includes a spherical display element, and a lens array located at a light emission side of the spherical display element. Lenses of the lens array are arranged on a spherical surface, the lens array and the spherical display element share a common spherical center, and a distance between each lens of the lens array and the spherical display element is configured such that a light beam emitted from each pixel point of the spherical display element is collimated after passing through the lens.

15 Claims, 12 Drawing Sheets

(56) References Cited

FOREIGN PATENT DOCUMENTS

JP          2014055891  A   *   3/2014
WO          2011110728  A1      9/2011

OTHER PUBLICATIONS

PCT Written Opinion, Application No. PCT/CN2019/089240, dated Dec. 27, 2019, 6 pages : with English translation of relevant part.
China First Office Action, Application No. 201980000759.0, dated Jan. 4, 2021, 14 pps.: with English translation.

* cited by examiner

NEAR-EYE DISPLAY PANEL AND NEAR-EYE DISPLAY DEVICE

CROSS REFERENCE TO RELATED APPLICATIONS

This patent application is a National Stage Entry of PCT/CN2019/089240 filed on May 30, 2019, the disclosure of which is incorporated by reference herein in its entirety as part of the present application.

BACKGROUND

Embodiments of the present disclosure relate to the field of display technologies, and more particularly, to a near-eye display panel and a near-eye display device.

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input, an augmented reality, or "AR", scenario typically involves presentation of digital or virtual image information as an augmentation to visualization of the actual world around the user.

BRIEF DESCRIPTION

One aspect of the present disclosure provides a near-eye display panel. The near-eye display panel includes a spherical display element, and a lens array located at a light emission side of the spherical display element. Lenses of the lens array are arranged on a spherical surface. The lens array and the spherical display element share a common spherical center. A distance between each lens of the lens array and the spherical display element is configured such that a light beam emitted from each pixel point of the spherical display element is collimated after passing through the lens.

In one or more embodiments of the present disclosure, the spherical display element is formed by splicing a plurality of sub-display elements.

In one or more embodiments of the present disclosure, each of the plurality of sub-display elements has a planar structure, and vertexes of each of the sub-display elements are located on a first spherical surface. The lens array includes a plurality of cell arrays in one-to-one correspondence with the plurality of sub-display elements, and vertexes of each of the cell arrays are located on a second spherical surface. The first spherical surface and the second spherical surface share a common spherical center.

In one or more embodiments of the present disclosure, the sub-display element has a polygonal shape.

In one or more embodiments of the present disclosure, the number of sides of the sub-display element is greater than or equal to four.

In one or more embodiments of the present disclosure, a side length of the sub-display element depends on a field of view of each of the sub-display elements and a radius of the spherical display element, and an angle between adjacent sub-display elements depends on a field angle of each of the sub-display elements.

In one or more embodiments of the present disclosure, the spherical display element includes one regular hexagon sub-display element and six isosceles trapezoid sub-display elements spliced around the regular hexagon sub-display element.

In one or more embodiments of the present disclosure, a field angle of the regular hexagon with respect to the spherical center is equal to a field angle of the isosceles trapezoid with respect to the spherical center. A side length $A_1A_2$ of the regular hexagon sub-display element is equal to a top side length of the isosceles trapezoid sub-display element, and satisfies an equation as below:

$$A_1A_2 = r\sin\alpha;$$

a bottom side length $B_1B_2$ of the isosceles trapezoid sub-display element satisfies an equation as below:

$$B_1B_2 = 2r\sin\alpha;$$

a waist length $A_1B_1$ of the isosceles trapezoid sub-display element satisfies an equation as below:

$$A_1B_1 = r\sqrt{2\left(1 - \sqrt{1 - 4\sin^2\alpha}\cos\alpha - 2\sin^2\alpha\right)};$$

an angle $\angle A_0EF$ between the regular hexagon sub-display element and the isosceles trapezoid sub-display element satisfies an equation as below:

$$\angle A_0EF = 180° - \arctan\frac{\cos\alpha - \sqrt{1 - 4\sin^2\alpha}}{\frac{\sqrt{3}}{2}\sin\alpha};$$

an angle $\angle C_2A_1C_6$ between two adjacent isosceles trapezoid sub-display elements satisfies equations as below:

$$\angle C_2A_1C_6 = \arccos\frac{2A_1C_2^2 - C_2C_6^2}{2A_1C_2^2},$$

wherein, $$A_1C_2 = r\frac{\sin\alpha\sqrt{2\left(\frac{8 - 8\sqrt{1 - 4\sin^2\alpha}}{\cos\alpha - 17\sin^2\alpha}\right)\left(\frac{1 - \sqrt{1 - 4\sin^2\alpha}}{\cos\alpha - 2\sin^2\alpha}\right)}}{4 - 4\sqrt{1 - 4\sin^2\alpha}\cos\alpha - 9\sin^2\alpha},$$

$$C_2C_6 = \frac{\sqrt{3}\,r\sin^3\alpha}{4 - 4\sqrt{1 - 4\sin^2\alpha}\cos\alpha - 9\sin^2\alpha} + \sqrt{3}\,r\sin\alpha,$$

$r$ represents a radius of the spherical display element, and $\alpha$ represents a field angle of the regular hexagon sub-display element and of the isosceles trapezoid sub-display element.

In one or more embodiments of the present disclosure, a total field angle $FOA_1$ of the spherical display element satisfies an equation as below:

$$FOA_1 = \alpha + 4\arcsin\frac{\sqrt{2\left(1 - \sqrt{1 - 4\sin^2\alpha}\cos\alpha - 2\sin^2\alpha\right)}}{2}.$$

In one or more embodiments of the present disclosure, the spherical display element includes one regular pentagon sub-display element and five regular hexagon sub-display elements spliced around the regular pentagon sub-display element.

In one or more embodiments of the present disclosure, a side length A of the regular pentagon sub-display element and a field angle $\alpha_1$ of the regular pentagon sub-display element satisfy an equation as below:

$$\alpha_1 = 2\arcsin(1.618A/2r);$$

a side length of the regular hexagon sub-display element is equal to a side length of the regular pentagon sub-display element, and a field angle $\alpha_2$ of the regular hexagon sub-display element satisfies an equation as below:

$$\alpha_2 = 2\arcsin(A/2r);$$

a total field angle of the spherical display element satisfies an equation as below:

$$FOA_2 = 2\arcsin(1.732A/2r) + 2\arcsin(1.539A/2r) + 2\arcsin(A/2r),$$

wherein r represents a radius of the spherical display element.

In one or more embodiments of the present disclosure, a focal length f of the lens satisfies an equation as below:

$$f = \frac{NpL}{\Phi};$$

a radius of curvature r' of the lens satisfies an equation as below:

$$r' = \frac{(n-1)NpL}{\Phi};$$

a distance t from the lens to the spherical display element satisfies an equation as below:

$$t = \frac{nNpL}{\Phi};$$

an aperture D of the lens satisfies an equation as below:

$$D = \frac{Zp}{2f},$$

wherein P represents a pixel pitch of the display element, $\Phi$ represents a pupil diameter of a human eye, N represents the number of pixels corresponding to light beams that enter a single eye through a single lens, L represents a viewing distance, Z represents an imaging depth of field, and n represents a refractive index of the lens.

In one or more embodiments of the present disclosure, $N \geq 20$.

In one or more embodiments of the present disclosure, $20\text{ mm} \leq L \leq 33.4873\text{ mm}$.

In one or more embodiments of the present disclosure, the near-eye display panel further includes a plurality of light modulating elements located between the spherical display element and the lens array and splicing portion provided between two adjacent sub-display elements. The light modulating elements correspond to the splicing portions one to one. The splicing portion is located within a projection of the light modulating element on the spherical display element. A refractive index of each of the light modulating elements gradually increases along a direction toward a center of the corresponding splicing portion.

In one or more embodiments of the present disclosure, the plurality of light modulating elements are formed as a whole.

Another aspect of the present disclosure provides a near-eye display device, which includes the near-eye display panel according to the present disclosure, such as the near-eye display panel according to one or more embodiments disclosed above and/or below in detail.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present application, in which.

Corresponding reference numerals indicate corresponding parts or features throughout the several views of the drawings.

DETAILED DESCRIPTION

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components will be omitted so as not to obscure the disclosure. Further, various embodiments encompass present and future known equivalents to the components referred to herein by way of illustration.

As used herein and in the appended claims, the singular form of a word includes the plural, and vice versa, unless the context clearly dictates otherwise. Thus, when a singular term is mentioned, it is generally inclusive of the plurals of the respective terms. As used herein, the expressions "have", "comprise" and "contain" as well as grammatical variations thereof are used in a non-exclusive way. Thus, the expression "A has B" as well as the expression "A comprises B" or "A contains B" may both refer to the fact that, besides B, A contains one or more further components and/or constituents, and to the case in which, besides B, no other components, constituents or elements are present in A.

Figure 1:
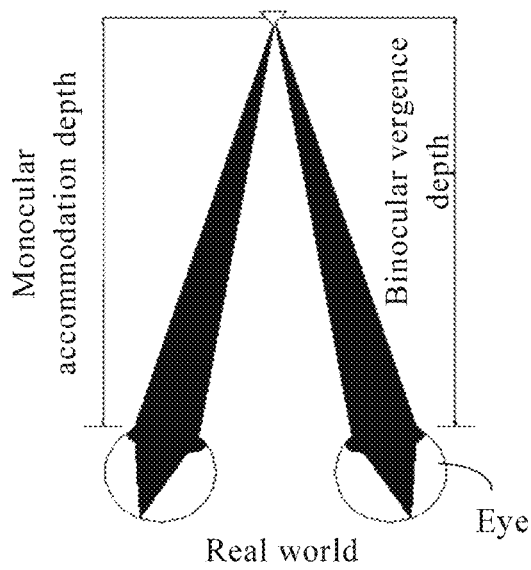
FIG. 1 schematically illustrates an accommodation depth and a vergence depth when a human eye is seeing a real world, in which the accommodation depth is consistent with the vergence depth.
Figure 2:
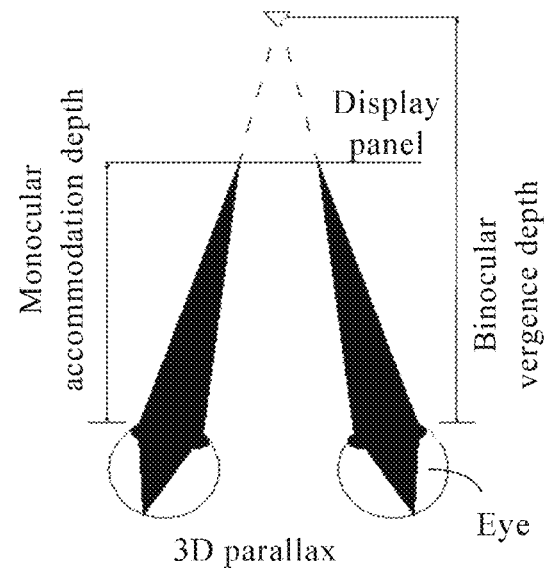
FIG. 2 schematically illustrates an accommodation depth and a vergence depth of a stereoscopic display device based on binocular parallax in related technologies, in which the accommodation depth is inconsistent with the vergence depth.

When people look at an object in the real world, monocular accommodation (monocular accommodation depth) and binocular vergence (binocular vergence depth) are in the same position, as shown in FIG. 1, so no eyestrain is caused. However, the stereoscopic display device in the related technologies provides binocular parallax, which supports convergence at any point, but only allows an observer to accommodate on a display surface, and thus suffers from an accommodation-vergence conflict. As shown in FIG. 2, when a user views an image through the stereoscopic display device, the monocular accommodation is fixed on a display plane, and the stereoscopic image that the user actually sees is not located on the display plane, but is located on different depth planes. As a result, inconsistency between the accommodation depth and the vergence depth may occur. The user generally feels dizzy when viewing for a long time using this stereoscopic display device based on binocular parallax.

Light field display may be treated as a display solution to solve the problem of accommodation-vergence conflict. The "light field" is a sum of all light information in the specified space, including color, light brightness, light direction, light distance, and so on. The key to the light field display technology lies in that it can display information on depth of field in addition to displaying basic image information like ordinary screens. As an imaging mode the most approximate to the human eye for viewing the natural environment, the light field can liberate ciliary muscle of the human eye from a fixed level of flexion, thereby eliminating dizziness and reducing eyestrain.

Figure 3:
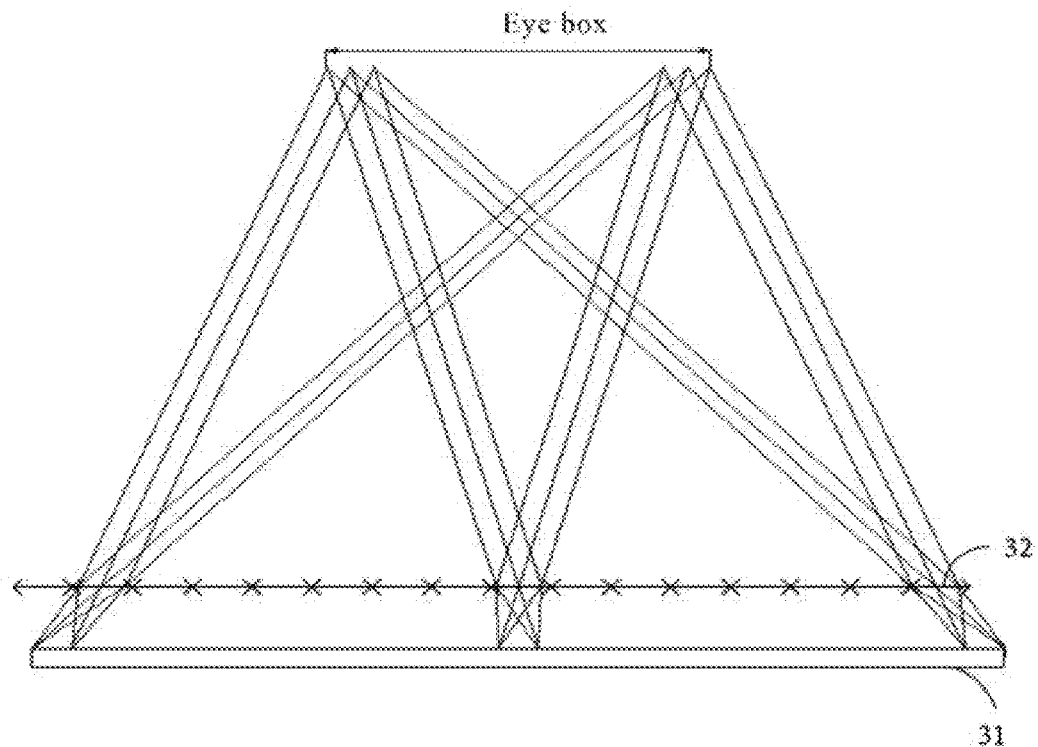
FIG. 3 schematically illustrates a light field display device based on a lens array.

In the related technologies, a variety of technical means may be employed to implement light field imaging, in which the light field imaging technology based on lens arrays has been widely studied. FIG. 3 schematically illustrates a light field display device based on a lens array. As shown in FIG. 3, the light field display device includes a display panel 31 and a lens array 32. The display panel 31 may be arranged on a focal plane of the lens array 32, such that the lens array 32 may change the direction of a light beam emitted from each pixel point (for example, collimating the light beam from the respective pixel point), thereby forming light field information. Specifically, the display panel 31 may be arranged on the focal plane of the lens array 32, and the spatial distribution of the light emission direction of each pixel may be obtained according to the distribution of pixels and lenses. A corresponding position relationship between an imaging point and each pixel of the display panel may be determined based on the known light direction information, such that corresponding display information is loaded to obtain a light field image.

Those skilled in the art may understand that the term "a focal plane of the lens array" herein may be an equivalent focal plane of a lens, and a light beam emitted by a pixel at the equivalent focal plane may be collimated after passing through the lens. The equivalent focal plane is not necessary the focal plane of the lens when the lens is placed in the air. This is because in practical applications, generally it is not an air layer provided between the lens array and the display panel, instead other dielectric layers (for example, a substrate) may likely be provided therebetween.

Figure 4:
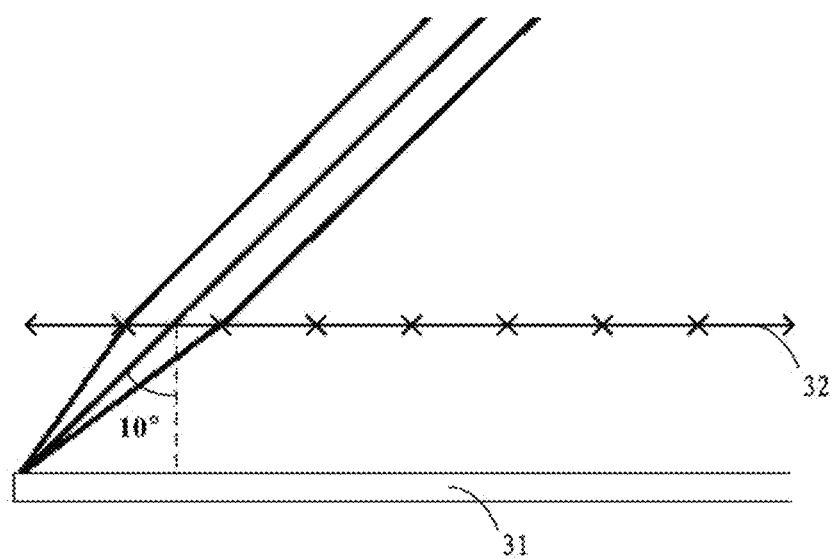
FIG. 4 schematically illustrates a maximum field of view of a single lens.

However, it is difficult to achieve a satisfactory effect with respect to the imaging field of view of an optical device for implementing light field display using a lens array. Generally, the imaging field of view of a light field display device depends on the field of view of a single lens. FIG. 4 schematically illustrates a maximum field of view of a single lens. As shown in FIG. 4, the field of view of the light field display device is equal to a maximum field of view of the single lens. Because the maximum field of view of the single lens for collimating a light beam generally does not exceed ±10°, the field of view for light field imaging is also limited within ±10°.

The term "the field of view of a single lens" herein may be expressed as an angle between a normal line of a lens that allow a light beam coming from a certain pixel (i.e., a pixel point) to enter a human eye and a connecting line between the certain pixel and a center of the lens. The term "the maximum field of view of a single lens" may be expressed as an angle between a normal line of a lens that allow a light beam coming from an edge pixel to enter a human eye and a connecting line between the edge pixel of the display panel and a center of the lens.

Some embodiments of the present disclosure provide a near-eye display panel, which can increase a field of view of light field imaging based on a lens array.

Figure 5:
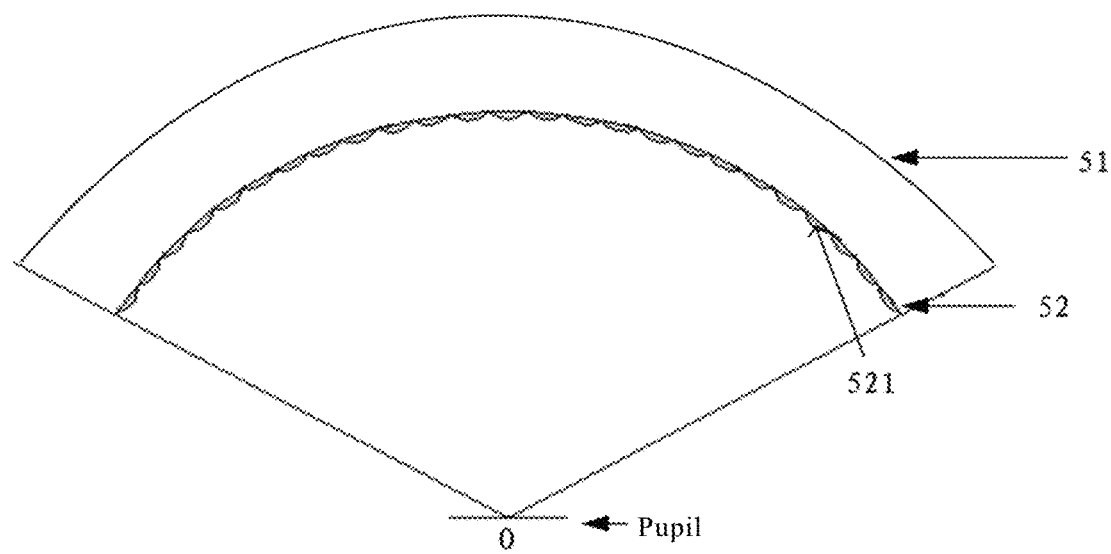
FIG. 5 schematically illustrates a sectional view of a near-eye display panel according to some embodiments of the present disclosure.

FIG. 5 schematically illustrates a sectional view of a near-eye display panel according to some embodiments of the present disclosure. As shown in FIG. 5, the near-eye display panel includes a spherical display element 51, and a lens array 52 located at a light emission side of the spherical display element 51. The lens array 52 includes a plurality of lenses 521 arranged on a spherical surface, the lens array 52 and the spherical display element 51 share a common spherical center O. A distance between each of the lenses 521 and the spherical display element 51 is configured such that a light beam emitted from each pixel point of the spherical display element 51 becomes a collimated light beam after passing through the lens 521. According to some embodiments of the present disclosure, the spherical display element 51 includes various display elements well known in the art, for example, including but not limited to, a liquid crystal display element, an OLED display element, an electrophoretic display element, and the like.

Those skilled in the art may understand that in some embodiments of the present disclosure, a light beam having a collimation degree (i.e., a divergence angle) not greater than a predetermined collimation degree may be referred to as a "collimated light beam". As an example, a light beam having a collimation degree less than 0.505° may be considered as a collimated light beam.

In addition, as described above, in some embodiments of the present disclosure, in the case where no any other elements is arranged between the spherical display element 51 and the lens array 52, that is, an air layer is provided therebetween, the spherical display element 51 may be arranged on the focal plane of the lens array 52. In the case where other element (such as a substrate) is arranged between the spherical display element 51 and the lens array 52, the spherical display element 51 may be arranged on the equivalent focal plane of the lens array 52. The equivalent focal plane is located at a position where a light beam emitted from each pixel point of the spherical display element 51 becomes the collimated light beam after passing through the lens.

In an exemplary embodiment, in order to obtain a better display effect, the spherical display element 51 and the lens array 52 may be designed such that their common spherical center is substantially located at a pupil position of a user in the use state.

It is to be noted that in one or more embodiments of the present disclosure, a "spherical surface" refers to a broadly-defined spherical surface having a spherical profile, which may include a situation of an overall smooth surface, or may also include a situation of a partially unsmooth surface such as a surface formed by splicing a plurality of planes and having a spherical profile.

In some embodiments of the present disclosure, the imaging field of view of the near-eye display panel may be increased by designing the display element and the lens array of the near-eye display panel as a spherical profile having a certain arc.

In one or more embodiments of the present disclosure, the spherical display element may be formed by splicing a plurality of sub-display elements.

Figure 6:
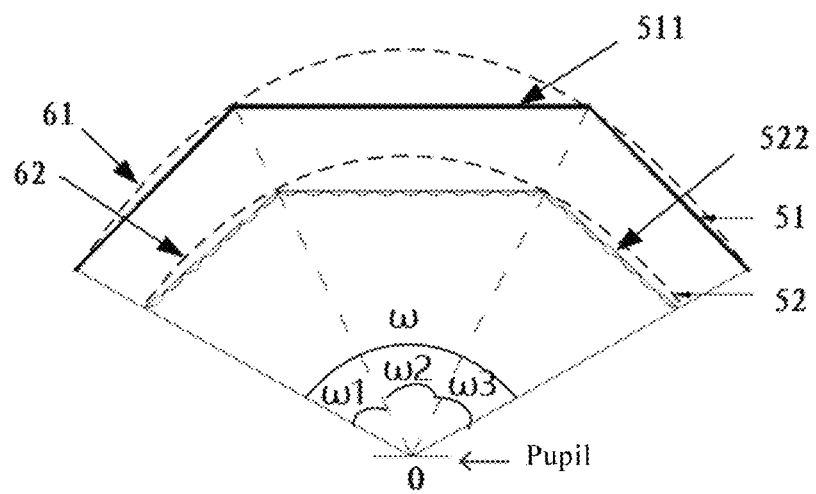
FIG. 6 schematically illustrates a sectional view of another near-eye display panel according to some embodiments of the present disclosure.

FIG. 6 schematically illustrates a sectional view of another near-eye display panel according to some embodiments of the present disclosure. As shown in FIG. 6, the near-eye display panel 51 may be formed by splicing a plurality of sub-display elements 511. Each of the sub-display elements 511 has a planar structure, and vertexes of each of the sub-display elements 511 are located on a first spherical surface 61. In this embodiment, the lens array 52 includes a plurality of cell arrays 522 in one-to-one correspondence with the plurality of sub-display elements 511, and vertexes of each of the cell arrays 522 are located on a second spherical surface 62. In some embodiments of the present disclosure, each cell array 522 includes a plurality of lenses. As used herein, term "vertex" refers to an intersection point of two adjacent sides of a polygonal shape, such as of a polygonal sub-display element, or of a cell array of the lens array.

In some embodiments of the present disclosure, each cell array 522 and the corresponding sub-display element 511 may have the same shape. In this case, the plurality of lenses included in each cell array 522 are also arranged in a planar structure, such that the sub-display element 511 is located on the equivalent focal plane of each lens of the corresponding cell array 522. With this configuration, a light beam emitted from a pixel point may become a substantially collimated light beam after passing through a single lens, thereby meeting the requirements of light field imaging.

As described above, the lens array 52 and the spherical display element 51 share a common spherical center. Therefore, the second spherical surface 62 and the first spherical surface 61 share a common spherical center. As an example, curvatures of the first spherical surface 61 and the second spherical surface 62 may be designed, such that their spherical centers O are substantially located at the pupil position in the use state. Thus, the imaging field of view of each sub-display element 511 satisfies imaging capability of a single lens, and the imaging field of views ($\omega 1$, $\omega 2$, and $\omega 3$) of the respective sub-display elements 511 may be spliced to form the imaging field of view of the entire spliced display element, which can increase the imaging field of view of the entire near-eye display panel ($\omega = \omega 1 + \omega 2 + \omega 3$).

In an exemplary embodiment, each of the sub-display elements 511 may have a polygonal shape. As an example, the number of sides of each of the sub-display elements 511 may be greater than or equal to four.

In some embodiments of the present disclosure, a side length of the sub-display element depends on a field of view of each of the sub-display elements and a radius of the spherical display element, and an angle between adjacent sub-display elements may depend on a field angle of each of the sub-display elements.

Configurations of two exemplary spherical display elements according to some embodiments of the present disclosure are described below with reference to FIG. 7-FIG. 11.

Figure 7:
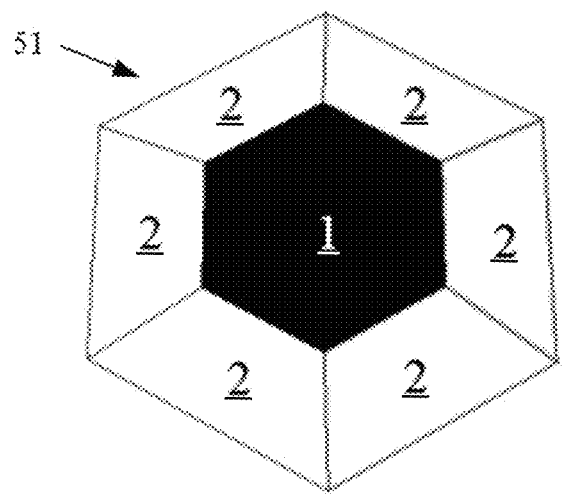
FIG. 7 schematically illustrates a top view of an exemplary spherical display element according to some embodiments of the present disclosure.

FIG. 7 schematically illustrates a top view of an exemplary spherical display element according to some embodiments of the present disclosure. As shown in FIG. 7, the spherical display element 51 of the near-eye display panel may include one regular hexagon sub-display element 1 and six isosceles trapezoid sub-display elements 2 spliced around the regular hexagon sub-display element.

Figure 8:
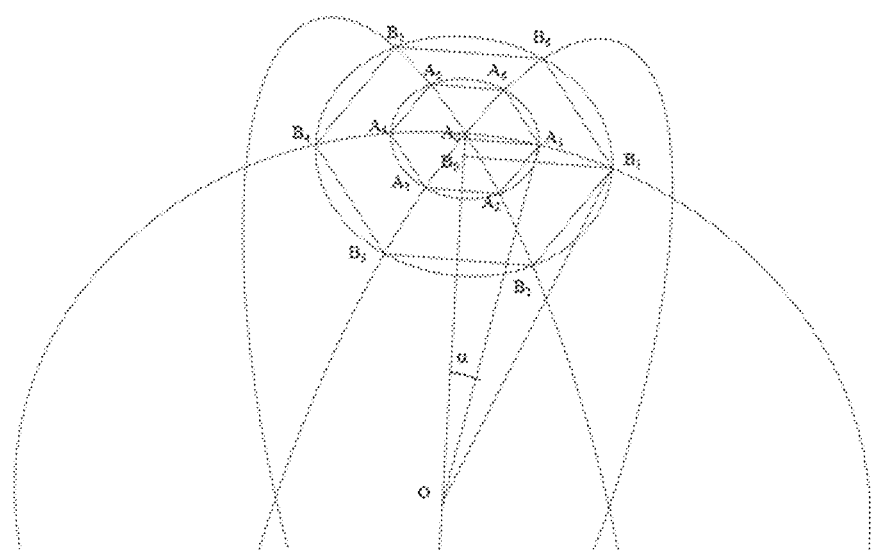
FIG. 8 illustrates a schematic diagram for calculating a side length of each of the sub-display elements of the spherical display element as shown in FIG. 7.

FIG. 8 illustrates a schematic diagram for calculating a side length of each sub-display element of the spherical display element as shown in FIG. 7. As shown in FIG. 8, a stereo structure formed by splicing one regular hexagon sub-display element and six isosceles trapezoid sub-display elements is a hexagonal prism, and vertexes of the hexagonal prism are located on a spherical surface with O as the spherical center. The top surface and the bottom surface of the hexagonal prism are both regular hexagons. The field angle α of the regular hexagon sub-display element with respect to the spherical center of the spherical display element is equal to the field angle (for example, 20°) of the isosceles trapezoid sub-display element with respect to the spherical center O. Therefore, the side length of the regular hexagon of the bottom surface of the hexagonal prism is twice as long as the side length of the regular hexagon of the top surface. Assume that $A_1, A_2, A_3, A_4, A_5$, and $A_6$ represent vertexes of the regular hexagon of the top surface, $A_0$ represents a center of a circumscribed circle of the regular hexagon of the top surface, $B_1, B_2, B_3, B_4, B_5$, and $B_6$ represent vertexes of the regular hexagon on the bottom surface, and $B_0$ represents a center of a circumscribed circle of the regular hexagon of the bottom surface, $B_1B_2=2A_1A_2$.

Further assume that a radius (a viewing distance, i.e., a distance from a human eye to the spherical display element in the use state) of the spherical display element is r, and a field angle of the regular hexagon sub-display element and a field angle of the isosceles trapezoid sub-display element are α.

As shown in FIG. 7 and FIG. 8, a side length $A_1A_2$ of the regular hexagon sub-display element is equal to a top side length of the isosceles trapezoid sub-display element, and satisfies an equation as below:

$$A_1A_2 = r\sin\alpha \quad (1)$$

a bottom side length $B_1B_2$ of the isosceles trapezoid sub-display element satisfies an equation as below:

$$B_1B_2 = 2r\sin\alpha \quad (2)$$

According to geometrical relationships $$\sin\angle B_1OB_0 = \frac{B_0B_1}{r} = 2\sin\alpha$$

and $\angle B_1OA_1 = \angle B_1OB_0 - \alpha$, a waist length $A_1B_1$ of the isosceles trapezoid sub-display element satisfies an equation as below:

$$A_1B_1 = \sqrt{2r^2\left(\frac{1-}{\cos\angle B_1OA_1}\right)} = r\sqrt{2\left(\frac{1-\sqrt{1-4\sin^2\alpha}}{\cos\alpha - 2\sin^2\alpha}\right)} \quad (3)$$

Figure 9A:
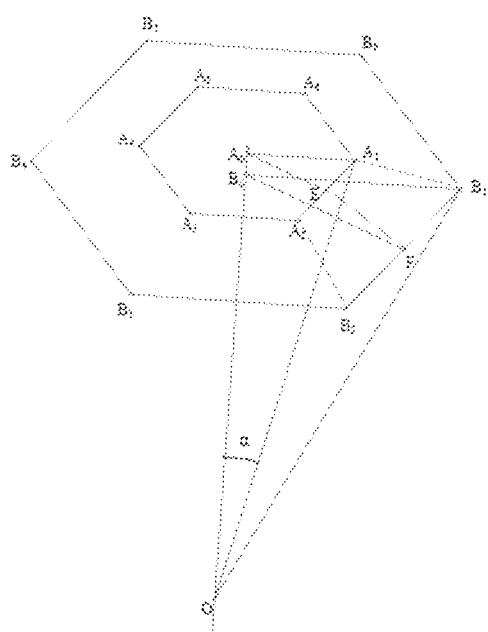
FIG. 9A illustrates a schematic diagram for calculating an angle between a regular hexagon sub-display element and an isosceles trapezoid sub-display element according to the embodiment as shown in FIG. 7.
Figure 9B:
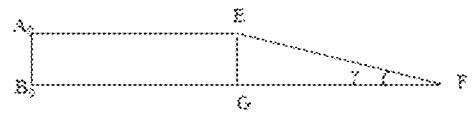
FIG. 9B illustrates a front view of the angle between the regular hexagon sub-display element and the isosceles trapezoid sub-display element.

FIG. 9A illustrates a schematic diagram for calculating an angle between a regular hexagon sub-display element and an isosceles trapezoid sub-display element according to the embodiment as shown in FIG. 7. FIG. 9B illustrates a front view of the angle between the regular hexagon sub-display element and the isosceles trapezoid sub-display element. As shown in FIG. 9A and FIG. 9B, $\angle A_0EF$ is equivalent to an angle between a regular hexagon screen and an isosceles trapezoid screen. Based on geometrical relationships as shown in FIG. 9A and FIG. 9B, following equations may be obtained:

$$A_0E = B_0G = GF = \frac{\sqrt{3}}{2}A_0A_1 = \frac{\sqrt{3}}{2}r\sin\alpha \quad (4)$$

$$OA_0 = r\cos\alpha \quad (5)$$

$$OB_0 = r\cos\angle B_1OB_0 = r\sqrt{1-4\sin^2\alpha} \quad (6)$$

$$A_0B_0 = OA_0 - OB_0 = r\left(\cos\alpha - \sqrt{1-4\sin^2\alpha}\right) \quad (7)$$

$$\angle EFB_0 = \arctan\frac{A_0B_0}{GF} = \arctan\frac{\cos\alpha - \sqrt{1-4\sin^2\alpha}}{\frac{\sqrt{3}}{2}\sin\alpha} \quad (8)$$

Based on Equations (5)-(8), an angle $\angle A_0EF$ between the regular hexagon sub-display element and the isosceles trapezoid sub-display element satisfies an equation as below:

$$\angle A_0EF = 180° - \angle EFB_0 = 180° - \arctan\frac{\cos\alpha - \sqrt{1-4\sin^2\alpha}}{\frac{\sqrt{3}}{2}\sin\alpha} \quad (9)$$

Figure 10A:
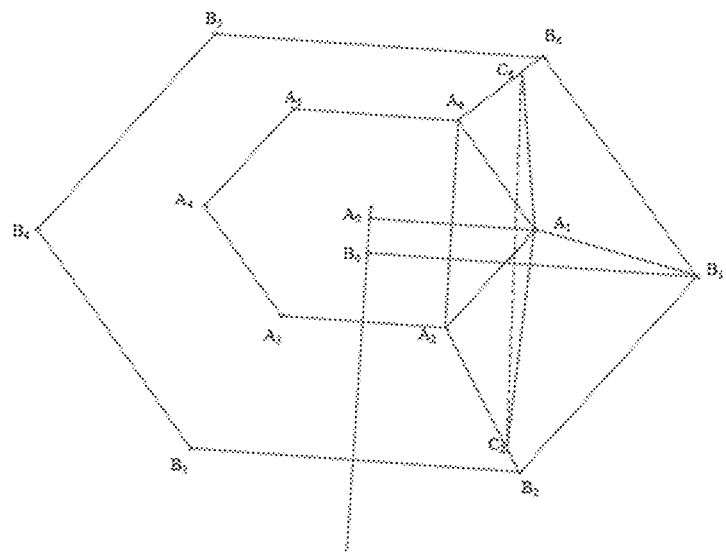
FIG. 10A illustrates auxiliary parameters for calculating an angle between two adjacent isosceles trapezoid sub-display elements according to the embodiment as shown in FIG. 7.
Figure 10B:
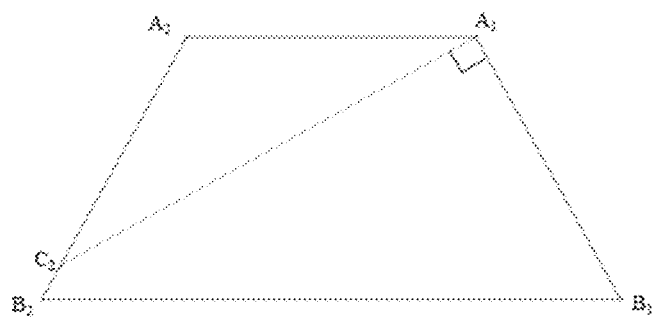
FIG. 10B illustrates a front view of the surface $A_1A_2B_2B_1$ in FIG. 10A.
Figure 10C:
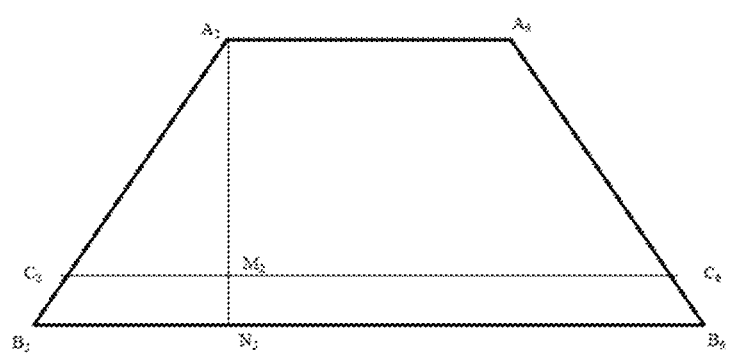
FIG. 10C illustrates a front view of the surface $A_2A_6B_6B_2$ in FIG. 10A.

FIG. 10A illustrates auxiliary parameters for calculating an angle between two adjacent isosceles trapezoid sub-display elements according to the embodiment as shown in FIG. 7, FIG. 10B illustrates a front view of the surface $A_1A_2B_2B_1$ in FIG. 10A, and FIG. 10C illustrates a front view of the surface $A_2A_6B_6B_2$ in FIG. 10A. As shown in FIGS. 10A-10C, $\angle C_2A_1C_6$ represents an angle between two adjacent isosceles trapezoid sub-display elements. Based on the geometrical relationships as shown in FIGS. 10A-10C, following equations may be obtained:

$$\cos\angle A_1B_1B_2 = \frac{A_1A_2}{2A_1B_1} = \frac{B_1B_2 - \sin\alpha}{2\sqrt{2\left(\frac{1-\sqrt{1-4\sin^2\alpha}}{\cos\alpha - 2\sin^2\alpha}\right)}} \quad (10)$$

$$\sin\angle A_1A_2C_2 = \quad (11)$$

$$\sin(180° - \angle A_1B_1B_2) = \sin\angle AB_1B_2 = \sqrt{1 - \frac{\sin^2\alpha}{8\left(\frac{1-\sqrt{1-4\sin^2\alpha}}{\cos\alpha - 2\sin^2\alpha}\right)}}$$

$$\sin\angle A_2A_1C_2 = \quad (12)$$

$$\sin(90° - \angle A_1B_1B_2) = \cos\angle A_1B_1B_2 = \frac{\sin\alpha}{2\sqrt{2\left(\frac{1-\sqrt{1-4\sin^2\alpha}}{\cos\alpha - 2\sin^2\alpha}\right)}}$$

$$\sin\angle A_2C_2A_1 = \sin(2\angle A_1B_1B_2 - 90°) = \quad (13)$$

$$1 - 2\cos^2\angle A_1B_1B_2 = 1 - \frac{\sin^2\alpha}{4\left(\frac{1-\sqrt{1-4\sin^2\alpha}}{\cos\alpha - 2\sin^2\alpha}\right)}$$

-continued $$A_2C_2 = A_1A_2\frac{\sin\angle A_2A_1C_2}{\sin\angle A_2C_2A_1} = r\frac{\sin^2\alpha\sqrt{2\left(\frac{1-\sqrt{1-4\sin^2\alpha}}{\cos\alpha-2\sin^2\alpha}\right)}}{4-4\sqrt{1-4\sin^2\alpha}\cos\alpha-9\sin^2\alpha} \quad (14)$$

In the case where the field of view of each sub-display element is 20°, the total field of view of the spherical display element formed by splicing one regular hexagon sub-display element and six isosceles trapezoid sub-display elements may reach 40.64° based on Equation (20).

Exemplary parameters of each sub-display element of the spherical display element in the embodiment as shown in FIG. 7 are listed in Table 1, assuming that the viewing distances are r=22 mm and r=33 mm, respectively, and the field of view of each sub-display element is 20°.

TABLE 1

| Viewing distance | Top side length of the trapezoid sub-display element | Bottom side length of the trapezoid sub-display element | Side length of the trapezoid sub-display element | Size of the regular hexagon sub-display element | Size of the trapezoid sub-display element | Angle between the regular hexagon sub-display element and the trapezoid sub-display element | Angle between trapezoid sub-display elements |
|---|---|---|---|---|---|---|---|
| 22 mm | 3.82 mm | 7.64 mm | 3.958 mm | 0.301 in | 0.301 in | 162.63° | 162.87° |
| 33 mm | 5.73 mm | 11.461 mm | 5.937 mm | 0.451 in | 0.451 in | 162.63° | 162.87° |

-continued $$A_1C_2 = A_1A_2\frac{\sin\angle A_1A_2C_2}{\sin\angle A_2C_2A_1} = \quad (15)$$

$$r\frac{\sin\alpha\sqrt{2\left(\frac{8-8\sqrt{1-4\sin^2\alpha}}{\cos\alpha-17\sin^2\alpha}\right)\left(\frac{1-\sqrt{1-4\sin^2\alpha}}{\cos\alpha-2\sin^2\alpha}\right)}}{4-4\sqrt{1-4\sin^2\alpha}\cos\alpha-9\sin^2\alpha}$$

$$B_2N_2 = \frac{B_2B_6 - A_2A_6}{2} = \frac{\sqrt{3}}{2}r\sin\alpha \quad (16)$$

$$C_2M_2 = \frac{A_2C_2}{A_2B_2}B_2N_2 = \frac{\sqrt{3}\,r\sin^3\alpha}{2\left(\frac{4-4\sqrt{1-4\sin^2\alpha}}{\cos\alpha-9\sin^2\alpha}\right)} \quad (17)$$

$$C_2C_6 = 2C_2M_2 + A_2A_6 = \frac{\sqrt{3}\,r\sin^3\alpha}{4-4\sqrt{1-4\sin^2\alpha}\cos\alpha-9\sin^2\alpha} + \sqrt{3}\,r\sin\alpha \quad (18)$$

$$\angle C_2A_1C_6 = \arccos\frac{2A_1C_2^2 - C_2C_6^2}{2A_1C_2^2} \quad (19)$$

Based on the above Equations (15), (18), and (19), the angle $\angle C_2A_1C_6$ between two adjacent isosceles trapezoids may be calculated out.

In the embodiment as shown in FIG. 7, the total field of view $FOA_1$ of the near-eye display panel is equal to the total field of view of the spherical display element formed by splicing one regular hexagon sub-display element and six isosceles trapezoid sub-display elements, which may be derived from the following equation:

$$FOA_1 = \alpha + 2 \times 2\arcsin(A_1B_1/2r) = \quad (20)$$

$$\alpha + 4\arcsin\frac{\sqrt{2\left(1-\sqrt{1-4\sin^2\alpha}\cos\alpha-2\sin^2\alpha\right)}}{2}$$

It is to be understood that in the above Table 1, the size of the sub-display element is the maximum distance between any two points on the display element.

Figure 11:
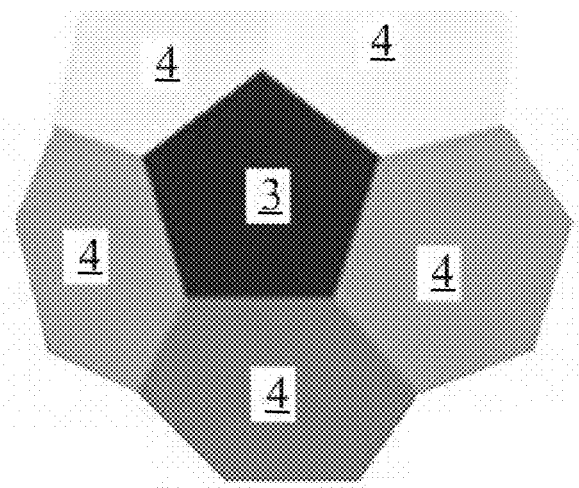
FIG. 11 schematically illustrates a top view of another exemplary near-eye display panel according to some embodiments of the present disclosure.

FIG. 11 schematically illustrates a top view of another exemplary near-eye display panel according to some embodiments of the present disclosure. As shown in FIG. 11, the spherical display element of the near-eye display panel may include one regular pentagon sub-display element 3 and five regular hexagon sub-display elements 4 spliced around the regular pentagon sub-display element 3. In the embodiment as shown in FIG. 11, a side length A of the regular pentagon sub-display element 3 and a field angle $\alpha_1$ of the regular pentagon sub-display element 3 satisfy an equation as below:

$$\alpha_1 = 2\arcsin(1.618A/2r) \quad (21)$$

A side length of the regular hexagon sub-display element 4 is equal to a side length of the regular pentagon sub-display element 3, and a field angle $\alpha_2$ of the regular hexagon sub-display element 4 satisfies an equation as below:

$$a_2 = 2\arcsin(A/2r) \quad (22)$$

The total field angle $FOA_2$ (that is, the total field angle of the near-eye display panel) of the spherical display element formed by splicing the regular pentagon sub-display element 3 and the five regular hexagon sub-display elements 4 satisfies an equation as below:

$$FOA_2 = 2\arcsin(1.732A/2r) + 2\arcsin(1.539A/2r) + 2\arcsin(A/2r) \quad (23)$$

In Equations (21) to (23), r represents a radius of the spherical display element.

Exemplary parameters of each sub-display element of the spherical display element in the embodiment as shown in FIG. 11 are listed in Table 2, assuming that when the viewing distances are r=22 mm and r=33 mm, respectively.

TABLE 2

| Viewing distance | Side length of the regular pentagon sub-display element and side length of the regular hexagon sub-display element | Size of the regular pentagon sub-display element | Size of the regular hexagon sub-display element | Angle between the regular pentagon sub-display element and the regular hexagon sub-display element | Angle between two adjacent sub-display elements |
|---|---|---|---|---|---|
| 22 mm | 9.064 mm | 0.58 in | 0.71 in | 142.62° | 138.19° |
| 33 mm | 13.6 mm | 0.87 in | 1.07 in | 142.62° | 138.19° |

In the case where a ratio of the side length of each sub-display element to the viewing distance satisfies a/r=0.412, the field angle $\alpha_1$ of the regular pentagon sub-display element may be obtained based on Equation (21), i.e., $\alpha_1$=38.9°; the field angle $\alpha_2$ of the regular hexagon sub-display element may be obtained based on Equation (22), that is, $a_2$=48.6°, and the total field angle $FOA_2$ of the spherical display element may be obtained based on Equation (23), that is, $FOA_2$=102.6°.

Design parameters of the lens array are described below with reference to FIGS. 12-15.

Figure 12:
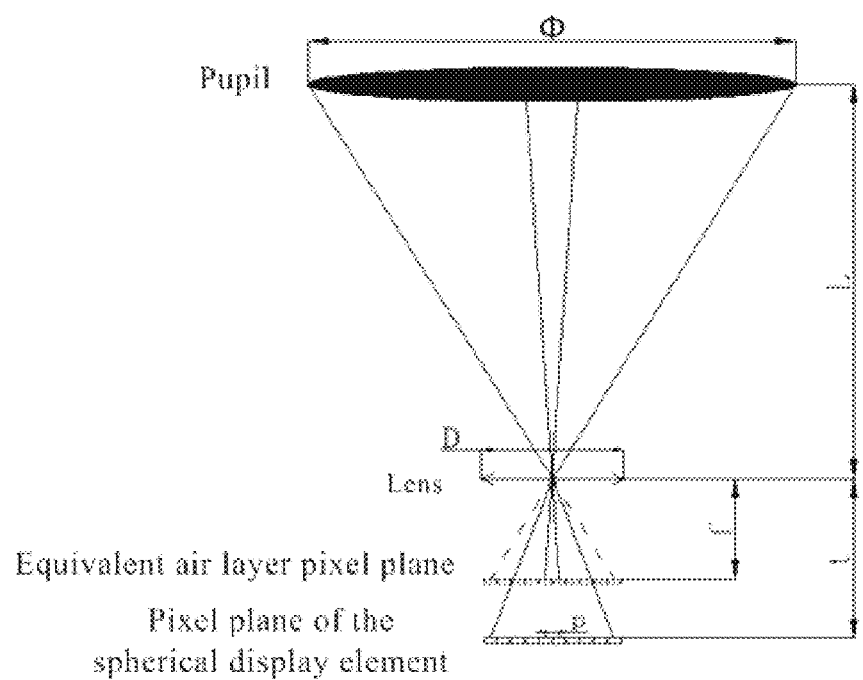
FIG. 12 is a schematic diagram for calculating design parameters of a lens array according to some embodiments of the present disclosure.

FIG. 12 is a schematic diagram for calculating the design parameters of the lens array according to some embodiments of the present disclosure. As shown in FIG. 12, P represents a pixel pitch of the spherical display element, Φ represents a pupil diameter of a human eye, N represents the number of pixels corresponding to light beams that can enter a single eye through a single lens (also known as the number of views of a single lens), L represents a viewing distance, i.e., a distance between the human eye and the lens array, n represents a refractive index of the lens array, f represents a focal length of the lens, r' represents a radius of curvature of the lens, t represents a placing height of the lens, that is, an actual distance between the lens array and the spherical display element (particularly, a pixel surface of the spherical display element), and D represents an aperture of each lens.

As already described above, in some embodiments of the present disclosure, in the case where no other elements is arranged between the lens array 52 and the spherical display element 51, that is, there is an air layer between the lens array 52 and the spherical display element 51, the placing height t of the lens is substantially equal to the focal length of the lens. However, in reality, other elements (such as a substrate) are generally arranged between the lens array 52 and the spherical display element 51. In this case, in order to enable a light beam emitted from each pixel point of the spherical display element 51 to become the collimated light beam after passing through the lens, it is required that the placing height t of the lens is equal to the equivalent focal length of the lens.

In FIG. 12, "equivalent air layer pixel plane" is a position where the pixel plane of the spherical display element is located to allow the light beam emitted from each pixel point of the spherical display element to become the collimated light beam after passing through the lens in the case where only an air layer is provided between the lens and the spherical display element. Generally, the "equivalent air layer pixel plane" is located in a focal plane of the lens in air.

Based on the geometric relationship and the optical imaging relationship in FIG. 12, the following equations may be obtained:

$$f = \frac{L}{\beta} \quad (24)$$

-continued $$\beta = \frac{\Phi/N}{p} \quad (25)$$

Based on Equation (24) and Equation (25), the focal length f of the lens may be derived as below:

$$f = \frac{NpL}{\Phi} \quad (26)$$

The radius of curvature r' of the lens may be expressed as:

$$r' = (n-1)f \quad (27)$$

Based on Equation (26) and Equation (27), the radius of curvature r' of the lens may be derived as below:

$$r' = \frac{(n-1)NpL}{\Phi} \quad (28)$$

In the case where a refractive index of an element between the lens array and the spherical display element is equal to the refractive index of the lens, the placing height t of the lens may be calculated based on an equation as below:

$$t = nf = \frac{nNpL}{\Phi} \quad (29)$$

Figure 13:
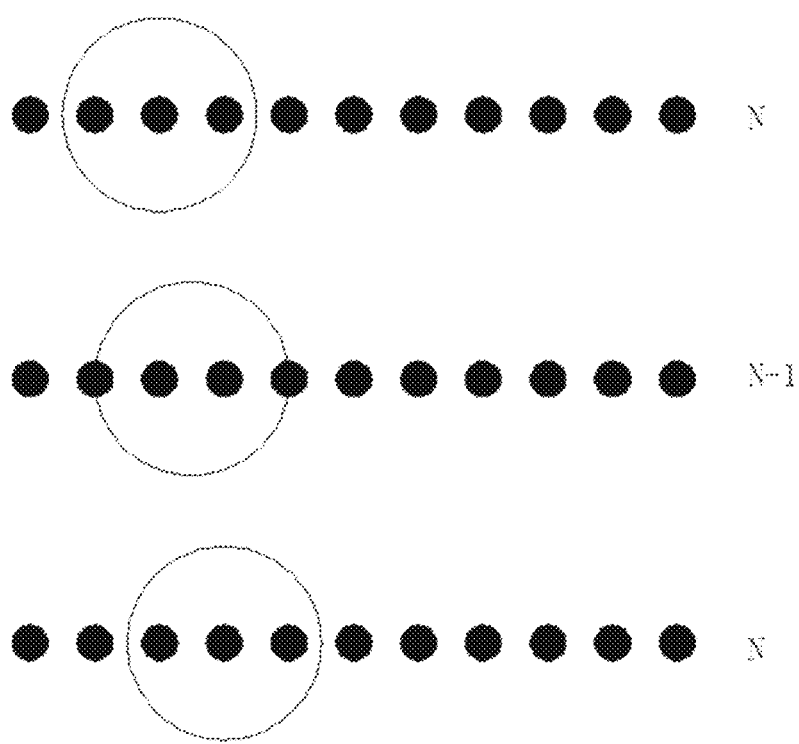
FIG. 13 schematically illustrates a variation of the number of pixels entering a human eye through a single lens as an eyeball rotates according to some embodiments of the present disclosure.

Those skilled in the art may understand that when an eyeball of the human eye rotates, the number of pixels corresponding to the light beams entering the human eye through the lens may vary. FIG. 13 schematically illustrates a variation of the number of pixels entering a human eye through a single lens as an eyeball rotates according to some embodiments of the present disclosure. As shown in FIG. 13, the number of full pixels entering the human eye has an alternate variation of N=N→N-1→N→N-1, which may cause a grayscale variation of an image produced by the light field as the rotation of the eyeball, thereby resulting in image hopping. Generally, a contrast resolution limit value of the human eye is 0.026. Therefore, during the human eye moves, the human eye does not perceive brightness variation if the contrast between a maximum grayscale brightness and a minimum grayscale brightness is less than 0.026. That is, $$M = \frac{N - (N-1)}{N + (N-1)} \leq 0.026 \quad (30)$$

Based on Equation (30), it may be derived that N≥19.73. In some embodiments of the present disclosure, N may be designed as: N≥20.

Figure 14:
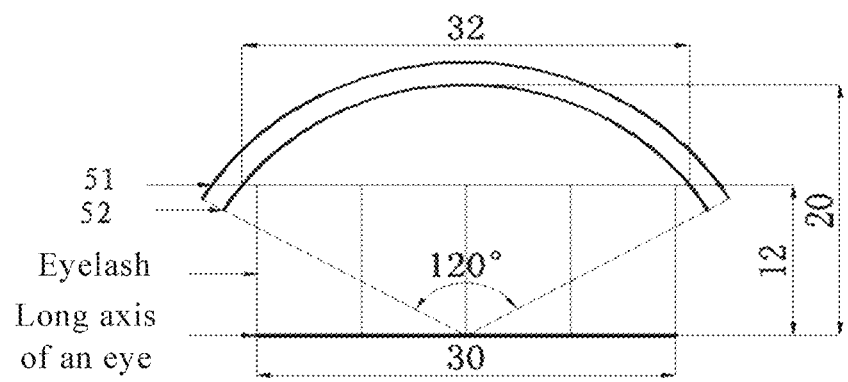
FIG. 14 illustrates a schematic diagram for obtaining a minimum viewing distance in the case where a field angle of a spherical display element is 120°.
Figure 15:
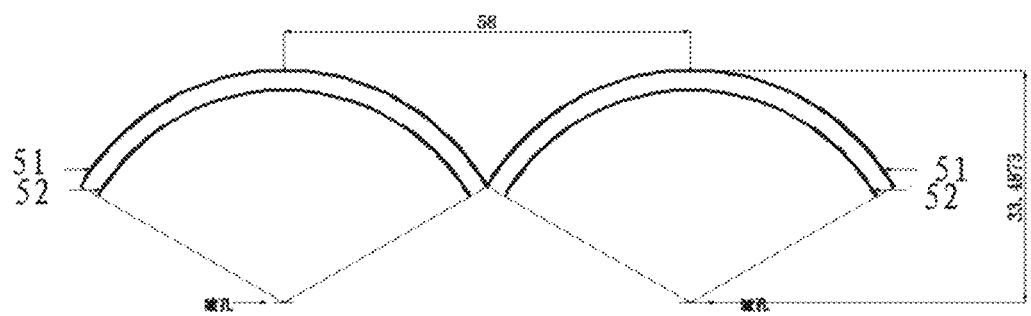
FIG. 15 illustrates a schematic diagram for obtaining a maximum viewing distance in the case where the field angle of the spherical display element is 120°.

FIG. 14 illustrates a schematic diagram for obtaining a minimum viewing distance in the case where the field angle of the spherical display element is 120°. As shown in FIG. 14, typically the length of an eyelash of the human eye ranges from 6 mm to 12 mm, so the viewing distance L≥20 mm. As thus, as long as a long axis of an eye does not exceed 32 mm, the eyelash of the human eye will not contact an object to be viewed during wearing the spherical display element. FIG. 15 illustrates a schematic diagram for obtaining a maximum viewing distance in the case where the field angle of the spherical display element is 120°. As shown in FIG. 15, generally the distance between two pupils of the human eyes ranges from 58 mm to 64 mm. In order to prevent images of two spherical display elements worn in front of two eyes from interfering with each other, the viewing distance L may be designed as: L≤33.4873 mm.

Therefore, in some embodiments of the present disclosure, 20 mm≤L≤33.4873 mm.

It is to be noted that the eye resembles an oval herein when an eye is opened, and a long axis of the oval is the "long axis of an eye" described above.

A design example of a lens array is listed in Table 3.

TABLE 3

| Pixel pitch P (mm) | Pupil diameter Φ (mm) | Number of views of a single lens N | Viewing distance L (mm) | Refractive index of a lens n | Imaging depth of field Z (mm) | Focal length of a lens f (mm) | Radius of curvature of a lens r' (mm) | Placing height of a lens t (mm) | Aperture of a lens D (mm) |
|---|---|---|---|---|---|---|---|---|---|
| 0.01095 | 3 | 20 | 30 | 1.49 | 1000 | 2.19 | 1.0731 | 3.2631 | 1.1415 |

Figure 16:
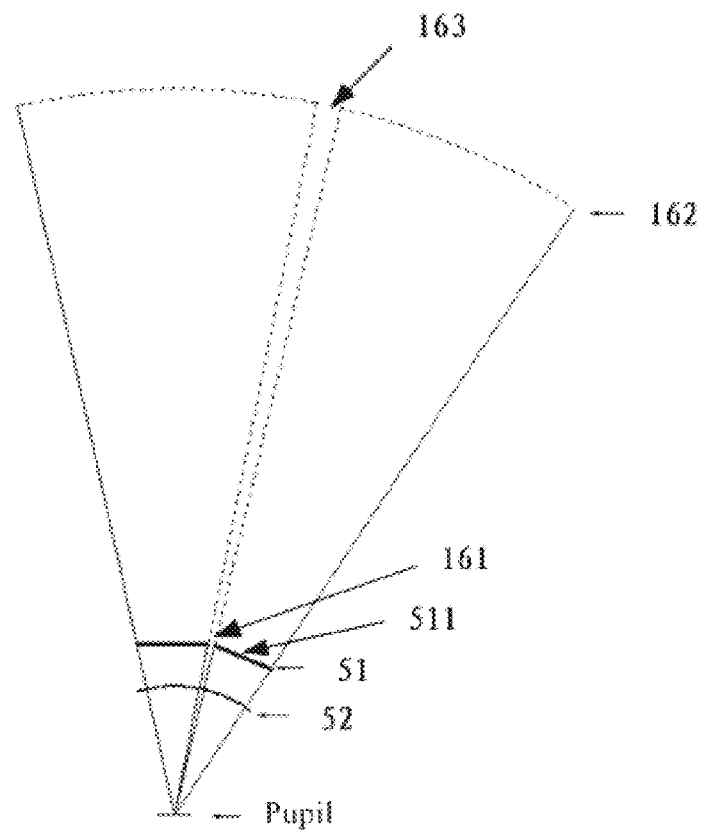
FIG. 16 schematically illustrates a splicing portion between two spliced sub-display elements according to some embodiments of the present disclosure.

As already described herein, the spherical display element 51 may be formed by splicing a plurality of sub-display elements 511. Because each sub-display element 511 has a frame, a splicing portion (also referred to as a splicing joint) 161 may be formed between two sub-display elements after splicing. The splicing portion generally is opaque and has no pixel, so there is no image to be seen at the position where the splicing portion is located. FIG. 16 schematically illustrates a splicing portion between two spliced sub-display elements 511 according to some embodiments of the present disclosure. As shown in FIG. 16, because between two spliced sub-display elements 511 there exists a splicing portion that cannot normally display an image, a dark display region 163 with a certain width may be formed at a position of a light field image plane 162 corresponding to the splicing portion 161 when an image is displayed.

In some embodiments of the present disclosure, the near-eye display panel may further include a plurality of light modulating elements located between the spliced spherical display element and the lens array. The light modulating elements correspond to the splicing portions one to one, the splicing portion is located within a projection of the light modulating element on the spherical display element, and a refractive index of each of the light modulating elements gradually increases along a direction toward a center of the corresponding splicing portion. By providing the light modulating element at the splicing portion, light near the splicing portion may be guided to a position corresponding to the splicing portion and emergent from the position corresponding to the splicing portion, so an image may also be displayed at the splicing portion.

In an exemplary embodiment of the present disclosure, the plurality of light modulating elements are formed as a whole. As an example, the plurality of light modulating elements may be integrally formed as a substrate with a periodically-varying refractive index. Each varying period of the refractive index of the substrate corresponds to one splicing portion of the spliced spherical display element. The refractive index of each varying period of the substrate gradually increases from two sides to the middle.

Figure 17:
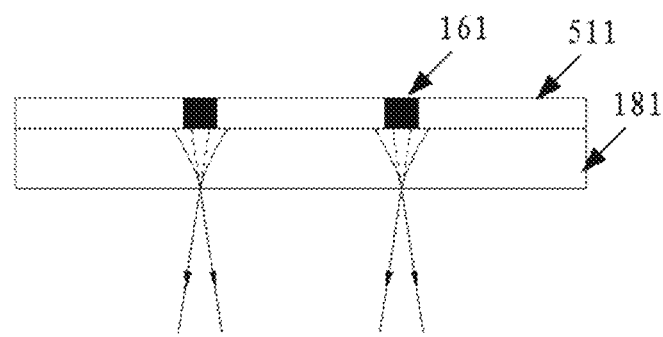
FIG. 17 is a schematic diagram illustrating light guided by a light modulating element to a position corresponding to splicing portion of the spherical display element and emergent from the position corresponding to the splicing portion according to some embodiments of the present disclosure.
Figure 18:
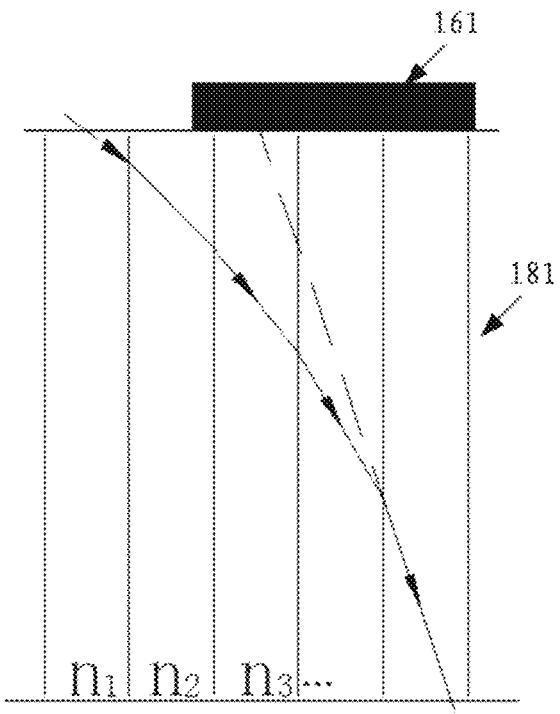
FIG. 18 is a schematic diagram illustrating a refractive index distribution of a light modulating element with respect to the corresponding splicing portion.

FIG. 17 illustrates a schematic diagram of light guided by a light modulating element to a splicing portion of the spherical display element and emergent from a position corresponding to the splicing portion according to some embodiments of the present disclosure, and FIG. 18 illustrates a schematic diagram of refractive index distribution of the light modulating element with respect to the corresponding splicing portion. As shown in FIG. 17 and FIG. 18, the refractive index of the light modulating element 181 is $n_1<n_2<n_3$ such that the light beam propagates from an optically thinner medium to an optically denser medium. An angle between a light ray refracted in the light modulating element and a normal line of an interface between the light modulating element 181 and the splicing portion 161 gradually decreases, such that a reverse extension line of an emergent ray intersects with the splicing portion 161. Therefore, it seems that the light ray emerges from the splicing portion 161, so it is sensuously considered that there also exists an image in the splicing portion.

Still another aspect of the present disclosure discloses a near-eye display device. Alternatively, the near-eye display device may include the near-eye display panel according to the present disclosure, for example, the near-eye display panel according to one or more embodiments disclosed above in detail. Therefore, reference may be made to the embodiments of the near-eye display panel for alternative embodiments of the near-eye display device.

Figure 19:
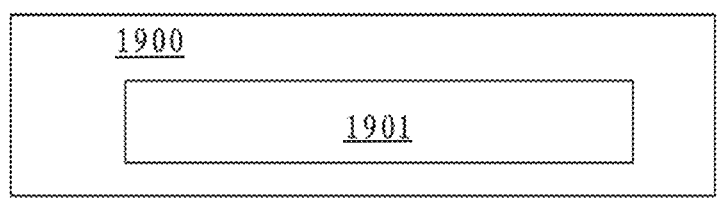
FIG. 19 schematically illustrates a block diagram of an exemplary near-eye display device according to some embodiments of the present disclosure.

FIG. 19 schematically illustrates a block diagram of an exemplary near-eye display device according to some embodiments of the present disclosure. As shown in FIG. 19, the near-eye display device 1900 may include a near-eye display panel 1901.

Those skilled in the art may understand that in addition to the near-eye display panel 1901, the near-eye display device according to the present disclosure may further include other elements or components as needed, such as an image processing device, a storage device. It can also be understood that the image processing device and the storage device may be separate components independent of the near-eye display panel, or may be integrated into the near-eye display panel.

The foregoing description of the embodiment has been provided for purpose of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are included within the scope of the disclosure.

What is claimed is:
1. A near-eye display panel comprising:
a spherical display element; and
a lens array located at a light emission side of the spherical display element, lenses of the lens array arranged on a spherical surface, the lens array and the spherical display element sharing a common spherical center, and a distance between each lens of the lens array and the spherical display element configured such that a light beam emitted from each pixel point of the spherical display element is collimated after passing through the corresponding lens, wherein the spherical display element is formed by splicing a plurality of sub-display elements, wherein each of the plurality of sub-display elements has a planar structure, wherein vertexes of each of the sub-display elements are located on a first spherical surface, wherein the lens array comprises a plurality of cell arrays in one-to-one correspondence with the plurality of sub-display elements, wherein vertexes of each of the cell arrays are located on a second spherical surface, and wherein the first spherical surface and the second spherical surface share a common spherical center, wherein the spherical display element comprises one regular hexagon sub-display element and six isosceles trapezoid sub-display elements spliced around the regular hexagon sub-display element, wherein a field angle of the regular hexagon sub-display element with respect to the spherical center is equal to a field angle of the isosceles trapezoid sub-display element with respect to the spherical center, a side length $A_1A_2$ of the regular hexagon sub-display element is equal to a top side length of the isosceles trapezoid sub-display element, and satisfies an equation as below:

$$A_1A_2 = r \sin a;$$

a bottom side length $B_1B_2$ of the isosceles trapezoid sub-display element satisfies an equation as below:

$$B_1B_2 = 2r \sin a;$$

a waist length $A_1B_1$ of the isosceles trapezoid sub-display element satisfies an equation as below:

$$A_1B_1 = r\sqrt{2\left|1 - \sqrt{1 - 4\sin^2 a} \cos a - 2\sin^2 a\right|};$$

an angle $-A_0EF$ between the regular hexagon sub-display element and the isosceles trapezoid sub-display element satisfies an equation as below:

$$-A_0EF = 180° - \arctan\frac{\cos a - \sqrt{1 - 4\sin^2 a}}{\frac{\sqrt{3}}{2}\sin a};$$

and an angle $-C_2A_1C_6$ between two adjacent isosceles trapezoid sub-display elements satisfies an equation as below:

$$-C_2A_1C_6 = \arccos\frac{2A_1C_2^2 - C_2C_6^2}{2A_1C_2^2},$$

wherein, $$A_1C_2 = \sin a \sqrt{2\left(8 - 8\sqrt{1 - 4\sin^2 a} \cos a - 17\sin^2 a\right)} \frac{\left(1 - \sqrt{1 - 4\sin^2 a} \cos a - 2\sin^2 a\right)}{4 - 4\sqrt{1 - 4\sin^2 a} \cos a - 9\sin^2 a},$$

$$C_2C_6 = \frac{\sqrt{3}\, r \sin^3 a}{4 - 4\sqrt{1 - 4\sin^2 a} \cos a - 9\sin^2 a} + \sqrt{3}\, r \sin a,$$

r represents a radius of the spherical display element, and α represents the field angle of the regular hexagon sub-display element and of the isosceles trapezoid sub-display element.

2. The near-eye display panel according to claim 1, wherein a total field angle $FOA_1$ of the spherical display element satisfies an equation as below:

$$FOA_1 = a + 4\arcsin\frac{\sqrt{2\left|1 - \sqrt{1 - 4\sin^2 a} \cos a - 2\sin^2 a\right|}}{2}.$$

3. The near-eye display panel according to claim 1, wherein a focal length f of each lens satisfies an equation:

$$f = \frac{NpL}{F};$$

a radius of curvature r' of each lens satisfies an equation:

$$r' = \frac{(n-1)NpL}{F};$$

a distance t from each lens to the spherical display element satisfies an equation:

$$t = \frac{nNpL}{F};$$

and an aperture D of each lens satisfies an equation:

$$D = \frac{Zp}{2f},$$

wherein P represents a pixel pitch of the display element, Φ represents a pupil diameter of a human eye, N represents the number of pixels corresponding to light beams that enter a single eye through a single corresponding lens, L represents a viewing distance, Z represents an imaging depth of field, and n represents a refractive index of the corresponding lens.

4. The near-eye display panel according to claim 3, wherein N≥20.

5. The near-eye display panel according to claim 3, wherein 20 mm≤L≤33.4873 mm.

6. The near-eye display panel according to claim 1, further comprising a plurality of light modulating elements located between the spherical display element and the lens array, and a splicing portion provided between two adjacent sub-display elements, wherein the light modulating elements correspond to the splicing portions one to one, wherein the splicing portion is located within a projection of the light modulating element on the spherical display element, and wherein a refractive index of each of the light modulating elements gradually increases along a direction toward a center of the corresponding splicing portion.

7. The near-eye display panel according to claim 6, wherein the plurality of light modulating elements are formed as a whole.

8. A near-eye display device comprising the near-eye display panel according to claim 1.

9. A near-eye display panel comprising:
a spherical display element; and
a lens array located at a light emission side of the spherical display element, lenses of the lens array arranged on a spherical surface, the lens array and the spherical display element sharing a common spherical center, and a distance between each lens of the lens array and the spherical display element configured such that a light beam emitted from each pixel point of the spherical display element is collimated after passing through the corresponding lens,
wherein the spherical display element is formed by splicing a plurality of sub-display elements, wherein each of the plurality of sub-display elements has a planar structure, wherein vertexes of each of the sub-display elements are located on a first spherical surface, wherein the lens array comprises a plurality of cell arrays in one-to-one correspondence with the plurality of sub-display elements, wherein vertexes of each of the cell arrays are located on a second spherical surface, and wherein the first spherical surface and the second spherical surface share a common spherical center,
wherein the spherical display element comprises one regular pentagon sub-display element and five regular hexagon sub-display elements spliced around the regular pentagon sub-display element,
wherein a side length A of the regular pentagon sub-display element and a field angle $\alpha_1$ of the regular pentagon sub-display element satisfy an equation as below:

$\alpha_1 = 2\ \arcsin(1.618A/2r)$;

a side length of the regular hexagon sub-display element is equal to a side length of the regular pentagon sub-display element, and a field angle $\alpha_2$ of the regular hexagon sub-display element satisfies an equation as below:

$\alpha_2 = 2\ \arcsin(A/2r)$; and a total field angle of the spherical display element satisfies an equation as below:

$FOA_2 = 2\ \arcsin(1.732A/2r) + 2\ \arcsin(1.539A/2r) + 2\ \arcsin(A/2r)$ wherein r represents a radius of the spherical display element.

10. The near-eye display panel according to claim 9, wherein
a focal length f of each lens satisfies an equation:

$$f = \frac{NpL}{F};$$

a radius of curvature r' of each lens satisfies an equation:

$$r' = \frac{(n-1)NpL}{F};$$

a distance t from each lens to the spherical display element satisfies an equation:

$$t = \frac{nNpL}{F};$$

and
an aperture D of each lens satisfies an equation:

$$D = \frac{Zp}{2f},$$

wherein P represents a pixel pitch of the display element, Φ represents a pupil diameter of a human eye, N represents the number of pixels corresponding to light beams that enter a single eye through a single corresponding lens, L represents a viewing distance, Z represents an imaging depth of field, and n represents a refractive index of the corresponding lens.

11. The near-eye display panel according to claim 10, wherein N≥20.

12. The near-eye display panel according to claim 10, wherein 20 mm≤L≤33.4873 mm.

13. The near-eye display panel according to claim 9, further comprising a plurality of light modulating elements located between the spherical display element and the lens array, and a splicing portion provided between two adjacent sub-display elements, wherein the light modulating elements correspond to the splicing portions one to one, wherein the splicing portion is located within a projection of the light modulating element on the spherical display element, and wherein a refractive index of each of the light modulating elements gradually increases along a direction toward a center of the corresponding splicing portion.

14. The near-eye display panel according to claim 13, wherein the plurality of light modulating elements are formed as a whole.

15. A near-eye display device comprising the near-eye display panel according to claim 9.

* * * * *

UNITED STATES PATENT AND TRADEMARK OFFICE
CERTIFICATE OF CORRECTION

PATENT NO. : 11,409,108 B2
APPLICATION NO. : 16/756000
DATED : August 9, 2022
INVENTOR(S) : Jian Gao It is certified that error appears in the above-identified patent and that said Letters Patent is hereby corrected as shown below:

In the Claims

In Claim 1, Column 17, Line 43, delete "$A_1B_1 = r\sqrt{2\left|1-\sqrt{1-4\sin^2 a}\cos a - 2\sin^2 a\right)}$;" and insert therefor -- $A_1B_1 = r\sqrt{2\left(1-\sqrt{1-4\sin^2 \alpha}\cos \alpha - 2\sin^2 \alpha\right)}$ --.

In Claim 1, Column 17, Line 47, delete "–A₀EF" and insert therefor -- $\angle A_0EF$ --.

In Claim 1, Column 17, Line 54, delete "$-A_0EF = 180° - \arctan\dfrac{\cos a - \sqrt{1-4\sin^2 a}}{\dfrac{\sqrt{3}}{2}\sin a}$;" and insert therefor -- $\angle A_0EF = 180° - \arctan\dfrac{\cos \alpha - \sqrt{1-4\sin^2 \alpha}}{\dfrac{\sqrt{3}}{2}\sin \alpha}$ --.

In Claim 1, Column 17, Line 58, delete "–C₂A₁C₆" and insert therefor -- $\angle C_2A_1C_6$ --.

In Claim 1, Column 17, Line 64, delete "$-C_2A_1C_6 = \arccos\dfrac{2A_1C_2^2 - C_2C_6^2}{2A_1C_2^2}$," and insert therefor -- $\angle C_2A_1C_6 = \arccos\dfrac{2A_1C_2^{\,2} - C_2C_6^{\,2}}{2A_1C_2^{\,2}}$ --.

Signed and Sealed this
Eighteenth Day of July, 2023

Katherine Kelly Vidal
*Director of the United States Patent and Trademark Office*

CERTIFICATE OF CORRECTION (continued)
U.S. Pat. No. 11,409,108 B2

In Claim 2, Column 18, Line 25, delete "$FOA_1 = a + 4\arcsin\dfrac{\sqrt{2\left|1 - \sqrt{1 - 4\sin^2 a}\ \cos a - 2\sin^2 a\right|}}{2}$"

and insert therefor -- $FOA_1 = \alpha + 4\arcsin\dfrac{\sqrt{2\left(1 - \sqrt{1 - 4\sin^2 \alpha}\ \cos \alpha - 2\sin^2 \alpha\right)}}{2}$ --.

In Claim 3, Column 18, Line 35, delete "$f = \dfrac{NpL}{F}$;" and insert therefor -- $f = \dfrac{NpL}{\Phi}$ --.

In Claim 3, Column 18, Line 41, delete "$r' = \dfrac{(n-1)NpL}{F}$;" and insert therefor -- $r' = \dfrac{(n-1)NpL}{\Phi}$ --.

In Claim 3, Column 18, Line 49, delete "$t = \dfrac{nNpL}{F}$;" and insert therefor -- $t = \dfrac{nNpL}{\Phi}$ --.

In Claim 10, Column 20, Line 8, delete "$f = \dfrac{NpL}{F}$;" and insert therefor -- $f = \dfrac{NpL}{\Phi}$ --.

In Claim 10, Column 20, Line 14, delete "$r' = \dfrac{(n-1)NpL}{F}$;" and insert therefor -- $r' = \dfrac{(n-1)NpL}{\Phi}$ --.

In Claim 10, Column 20, Line 21, delete "$t = \dfrac{nNpL}{F}$;" and insert therefor -- $t = \dfrac{nNpL}{\Phi}$ --.